United States Patent
Haruna et al.

(10) Patent No.: US 11,327,748 B2
(45) Date of Patent: May 10, 2022

(54) SOFTWARE COOPERATION POSSIBILITY DETERMINATION APPARATUS AND SOFTWARE COOPERATION POSSIBILITY DETERMINATION METHOD

(71) Applicant: Hitachi, Ltd., Tokyo (JP)

(72) Inventors: Takaaki Haruna, Tokyo (JP); Takuya Oda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/200,214

(22) Filed: Mar. 12, 2021

(65) Prior Publication Data

US 2022/0004382 A1    Jan. 6, 2022

(30) Foreign Application Priority Data

Jul. 2, 2020 (JP) .............................. JP2020-114632

(51) Int. Cl.
G06F 8/71 (2018.01)
(52) U.S. Cl.
CPC ...................................... G06F 8/71 (2013.01)
(58) Field of Classification Search
USPC ........................................................ 717/121
See application file for complete search history.

(56) References Cited

U.S. PATENT DOCUMENTS

2011/0283257 A1* 11/2011 Charisius .................. G06F 8/33
717/109
2019/0251013 A1*  8/2019 Agarwal ............. G06F 11/3604

FOREIGN PATENT DOCUMENTS

JP          2014096018 A     5/2014

* cited by examiner

*Primary Examiner* — John Q Chavis
(74) *Attorney, Agent, or Firm* — Procopio, Cory, Hargreaves & Savitch LLP

(57) ABSTRACT

A software cooperation possibility determination apparatus stores pieces of software configuration information which are pieces of information regarding configurations of determination target software which is software for which cooperation possibility with cooperation destination software which is software of a cooperation destination is to be determined and verified software which is software verified that the software is able to cooperate with the cooperation destination software, acquires information regarding data output from the determination target software and information regarding data output from the verified software and input to the cooperation destination software from the pieces of software configuration information, and determines consistency or similarity between the information regarding the data output from the determination target software and the information regarding the data output from the verified software, and determines the cooperation possibility of the determination target software with the cooperation destination software based on a result of the determination.

15 Claims, 11 Drawing Sheets

| SOFTWARE ID | OUTPUT DATA | INPUT DATA | ACQUISITION SOURCE TYPE | ... |
|---|---|---|---|---|
| Reference_1 | FAILURE RATE | PERIOD START DATE AND TIME | INSIDE | ... |
| Reference_1 | FAILURE RATE | PERIOD END DATE AND TIME | INSIDE | ... |
| Reference_1 | FAILURE RATE | SENSOR MEASUREMENT VALUE | OUTSIDE | ... |
| : | : | : | : | ... |
| Program_A | FAILURE RATE | PERIOD START DATE AND TIME | INSIDE | ... |
| Program_A | FAILURE RATE | PERIOD END DATE AND TIME | INSIDE | ... |
| Program_A | FAILURE RATE | MAINTENANCE RECORD | OUTSIDE | ... |
| : | : | : | : | ... |
| Program_B | FAILURE RATE | DEVICE MODEL ID | INSIDE | ... |
| Program_B | FAILURE RATE | DEVICE INFORMATION | OUTSIDE | ... |
| : | : | : | : | ... |

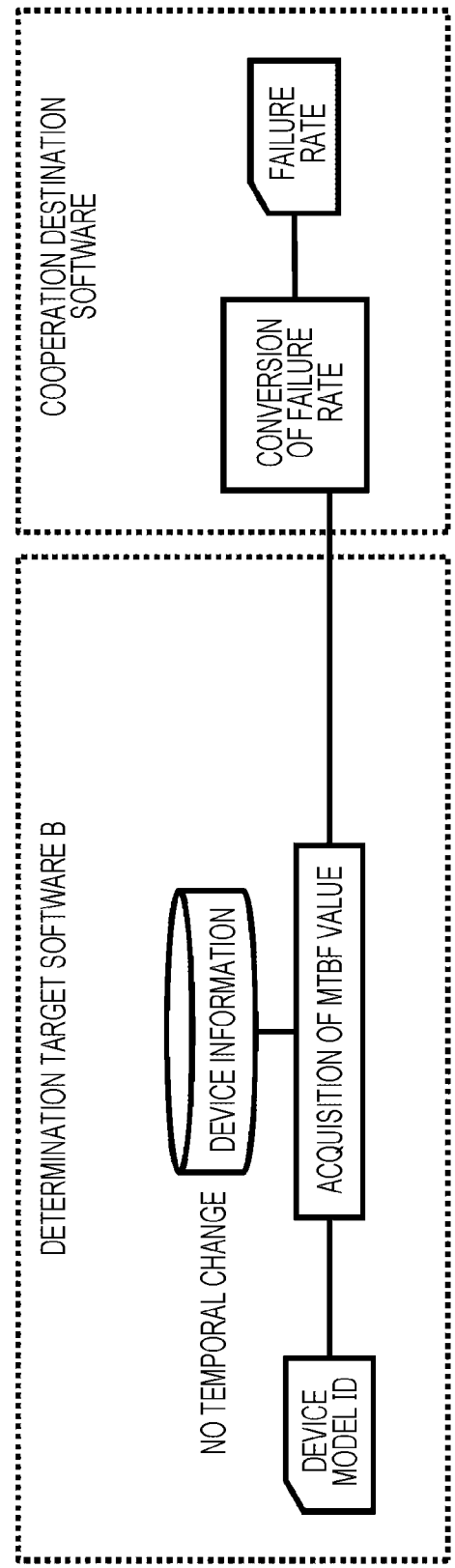

*FIG. 3A*

| SOFTWARE ID | SOURCE CODE | DEFINITION INFORMATION (1) | ... | DEFINITION INFORMATION (n) |
|---|---|---|---|---|
| Reference_1 | ... | ... | ... | ... |
| Program_A | ... | ... | ... | ... |
| Program_B | ... | ... | ... | ... |
| ... | ... | ... | ... | ... |

1111 — SOFTWARE ID
1112 — SOURCE CODE
1113 — DEFINITION INFORMATION (1) ... DEFINITION INFORMATION (n)
111

FIG. 3B

| SOFTWARE ID | RESOURCE NAME | LOCATION INFORMATION | DATA CHARACTERISTICS | TEMPORAL CHANGE |
|---|---|---|---|---|
| Reference_1 | DEVICE TIME-SERIES INFORMATION | 'file://...' | CONTINUOUS VALUE | PRESENCE |
| Program_A | MAINTENANCE RECORD | 'http://...' | DISCRETE VALUE | PRESENCE |
| Program_B | DEVICE INFORMATION | '/usr/data/...' | FINITE VALUE | ABSENCE |
| ... | ... | ... | ... | ... |

FIG. 4

| SOFTWARE ID 1131 | OUTPUT DATA 1132 | INPUT DATA 1133 | ACQUISITION SOURCE TYPE 1134 | |
|---|---|---|---|---|
| Reference_1 | FAILURE RATE | PERIOD START DATE AND TIME | INSIDE | ⋮ |
| Reference_1 | FAILURE RATE | PERIOD END DATE AND TIME | INSIDE | ⋮ |
| Reference_1 | FAILURE RATE | SENSOR MEASUREMENT VALUE | OUTSIDE | ⋮ |
| ⋮ | ⋮ | ⋮ | ⋮ | ⋮ |
| Program_A | FAILURE RATE | PERIOD START DATE AND TIME | INSIDE | ⋮ |
| Program_A | FAILURE RATE | PERIOD END DATE AND TIME | INSIDE | ⋮ |
| Program_A | FAILURE RATE | MAINTENANCE RECORD | OUTSIDE | ⋮ |
| ⋮ | ⋮ | ⋮ | ⋮ | ⋮ |
| Program_B | FAILURE RATE | DEVICE MODEL ID | INSIDE | ⋮ |
| Program_B | FAILURE RATE | DEVICE INFORMATION | OUTSIDE | ⋮ |
| ⋮ | ⋮ | ⋮ | ⋮ | ⋮ |

| SOFTWARE ID (1) | SOFTWARE ID (2) | COOPERATION POSSIBILITY | DETERMINATION REASON | APPROVAL/ DISAPPROVAL |
|---|---|---|---|---|
| 1141 | 1142 | 1143 | 1144 | 1145 |
| Program_A | Reference_1 | POSSIBLE | CONSISTENCY | APPROVAL |
| Program_B | Reference_1 | IMPOSSIBLE | INCONSISTENCY BETWEEN SOFTWARE STRUCTURES | APPROVAL |
| Program_C | Program_A | POSSIBLE | SIMILARITY >THRESHOLD | APPROVAL |
| .. | .. | .. | .. | .. |

SOFTWARE COOPERATION POSSIBILITY DETERMINATION APPARATUS AND SOFTWARE COOPERATION POSSIBILITY DETERMINATION METHOD

CROSS-REFERENCE TO RELATED APPLICATION

This application claims priority pursuant to Japanese patent application No. 2020-114632, filed on Jul. 2, 2020, the entire disclosure of which is incorporated herein by reference.

BACKGROUND

Technical Field

The present invention relates to a software cooperation possibility determination apparatus and a software cooperation possibility determination method.

Related Art

JP 2014-96018 A describes a data structure management apparatus configured to enable data access even though a structure of data accessed by an application changes. The data structure management apparatus includes a meta-information database that stores a generation number indicating a generation of a data configuration and item information in association with each other, an application introduction meta-information generation management database that stores information for specifying an application and information indicating the generation of the data configuration in association with each other, and a data structure master change processing unit that determines a difference in the data structure by comparing data with the information indicated by the meta-information database when the data is accepted, outputs the difference as structure conversion data when there is the difference in the data structure, counts up the generation number of the meta-information database, and newly adds the counted-up generation number as a record.

In an organization such as a company that conducts business by using an information processing system, a huge number of developed or operating software assets are accumulated in many cases. Many of these software assets have acquired high reliability and stability through operational experience and careful testing for many years, and it is important to effectively use these software assets from the viewpoint of improvement of software production efficiency and expansion of a scale of the business (efficient horizontal expansion to other projects and other customers).

Here, it is necessary to confirm cooperation possibility between pieces of software in using the software assets. For example, it is necessary to confirm that a data configuration (data type, data structure, or the like) output from the software as a cooperation source is consistent with a required data configuration of data input to software as a cooperation destination. In order to obtain an expected processing result from the software as the cooperation destination, it is also necessary to confirm that a meaning of the data output from the software as the cooperation source and a meaning of the data input to the software as the cooperation destination are consistent with each other.

In the technology described in JP 2014-96018 A, when a cooperation operation fails due to the difference in the data structure, the difference in the data structure is registered in the meta-information database and a data structure master is updated. However, this technology does not consider a difference in the meaning of the data.

SUMMARY

The present invention has been made in view of such a background, and an object of the present invention is to provide a software cooperation possibility determination apparatus and a software cooperation possibility determination method capable of determining cooperation possibility of software appropriately and efficiently.

One of the present inventions for achieving the above object is a software cooperation possibility determination apparatus. The apparatus is achieved by using an information processing apparatus. The apparatus comprises a storage unit configured to store pieces of software configuration information which are pieces of information regarding configurations of determination target software which is software for which cooperation possibility with cooperation destination software which is software of a cooperation destination is to be determined and verified software which is software verified that the software is able to cooperate with the cooperation destination software, a software analysis unit configured to acquire information regarding data output from the determination target software and information regarding data output from the verified software and input to the cooperation destination software from the pieces of software configuration information, and a cooperation possibility determination unit configured to determine the cooperation possibility of the determination target software with the cooperation destination software based on consistency or similarity between the information regarding the data output from the determination target software and the information regarding the data output from the verified software and input to the cooperation destination software.

According to the present invention, it is possible to determine cooperation possibility of software appropriately and efficiently.

Other objects, configurations, and effects will be made apparent in the following description of the preferred embodiments.

BRIEF DESCRIPTION OF THE DRAWINGS

FIGS. 1A to 1C are schematic diagrams illustrating a relationship between determination target software, cooperation destination software, and verified software, FIG. 1A is a schematic diagram illustrating the relationship between the verified software and the cooperation destination software, FIG. 1B is a schematic diagram illustrating the relationship between determination target software A and the cooperation destination software, and FIG. 1C is a schematic diagram illustrating the relationship between determination target software B and the cooperation destination software;

FIG. 3A is an example of software configuration information;

FIG. 3B is an example of resource information;

FIG. 4 is an example of an analysis result;

FIG. 5 is an example of a determination result;

DESCRIPTION OF EMBODIMENTS

Figure 1A:
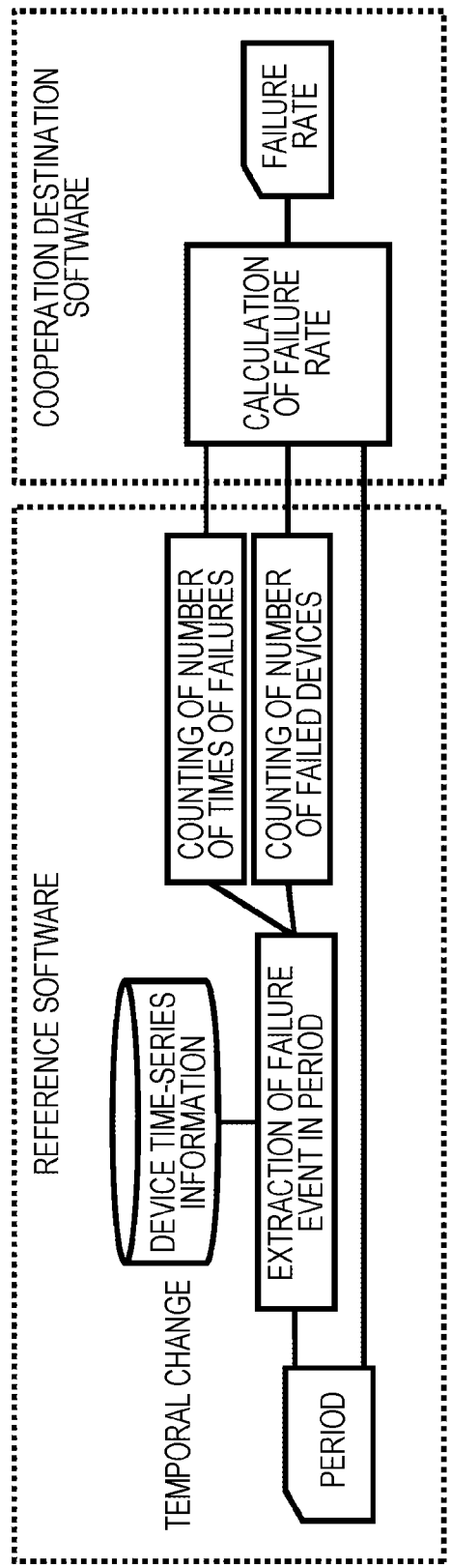

Hereinafter, embodiments of the present invention will be described with reference to the drawings. The following description and drawings are examples for describing the present invention, and are appropriately omitted and simplified in order to clarify the description. The present invention can be implemented in other various forms. Unless otherwise limited, each component may be singular or plural.

In the following description, the same portions or portions having similar functions share the same reference signs in different drawings, and redundant descriptions may be omitted. When there is a plurality of components having the same or similar functions, the same reference signs may be given with different subscripts. In this case, when there is no need to distinguish between the plurality of components, the description may be made while the subscripts are omitted.

In the following description, various pieces of data may be described by using an expression called "information", but various pieces of data may be expressed by a data structure other than a table or list. When identification information is described, expressions such as an "identifier" and an "ID" are used, but these pieces of information are interchangeable. In the following description, a letter "S" added before the reference sign means a processing step.

Hereinafter, a cooperation possibility determination apparatus 100 which is an information processing apparatus according to an embodiment of the present invention will be described. The cooperation possibility determination apparatus 100 is an apparatus that determines whether software (hereinafter, referred to as "cooperation destination software") which is one of a huge number of developed or operating software assets which are accumulated and managed in an organization such as a company that conducts business by using an information processing system can be used in cooperation with another software (hereinafter, referred to as "determination target software"), more specifically, whether data output from the determination target software can be input to and appropriately used in the cooperation destination software. The determination target software is, for example, software under development or existing software, and is, for example, software of which functions efficiently are expanded by using the cooperation destination software which is a software asset. The determination target software may or may not be one of the above software assets.

The cooperation possibility determination apparatus 100 performs the determination by comparing the determination target software with software (hereinafter, referred to as "verified software") verified (confirmed) that the software is able to cooperate with the cooperation destination software as a cooperation destination, that is, able to input and appropriately use data output from the verified software. The verified software is, for example, software managed as the software asset or software developed prior to the determination target software. The verified software can be arbitrarily set by a user as long as the verified software is software confirmed to be able to cooperate with the cooperation destination software. For example, the determination target software already verified that the software is able to cooperate by the cooperation possibility determination apparatus 100 can be used as the verified software when a cooperation possibility of another determination target software is determined.

Figure 1B:
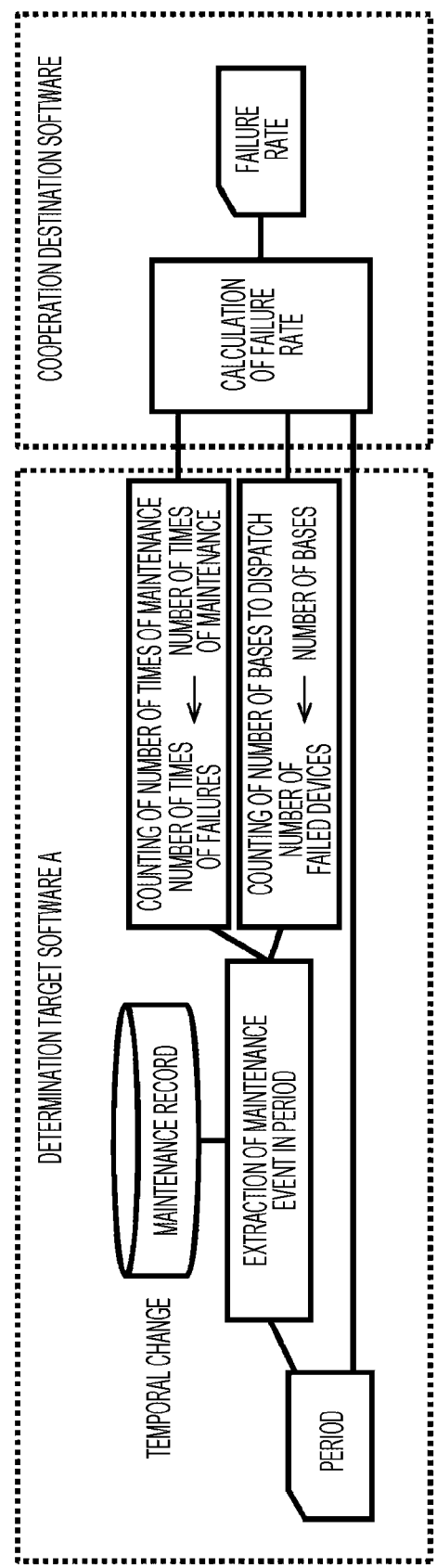

FIGS. 1A to 1C are schematic diagrams illustrating a relationship between the determination target software, the cooperation destination software, and the verified software. Exemplified cooperation destination software is software that accepts, as input data, data of which a value changes over time (hereinafter, referred to as "time-series data") as a variable having a variable name called "failure rate", and outputs warning information when a value of the accepted data exceeds a threshold. Exemplified pieces of verified software and determination target software A and B are all pieces of software that output data having a variable name called "failure rate" as output data.

As illustrated in FIG. 1A, the exemplified verified software is software applied to a factory monitoring system using IoT, and extracts information regarding failures of devices within a period designated by the user from time-series data (sensor information or the like) acquired from a monitored device, counts the number of times of failures of the devices and the number of failed devices within the period based on the extracted information, obtains failure rates of the devices in the period based on the counted values, and outputs the obtained failure rate as numerical data.

As illustrated in FIG. 1B, in a maintenance operation system of the device, the exemplified determination target software A extracts information regarding a device as a maintenance target within a period designated by the user from a maintenance record of the device, counts the number of times of maintenance of the device and the number of bases from which a maintenance personnel is dispatched when the maintenance is performed in the period based on the extracted information, obtains the failure rate of the device in the period based on the counted values, and outputs the obtained failure rate as numerical data.

As illustrated in FIG. 1C, in a device information management system, the exemplified determination target software B obtains, as the failure rate, a value of mean time between failures (MTBF) of the device specified by an identifier of a device model (hereinafter, referred to as a "device model ID") designated by the user based on the device model ID and device information (catalog information and specifications), and outputs the obtained value as numerical data.

Here, for example, when it is determined whether the cooperation possibility of each of the pieces of determination target software A and B with the cooperation destination software is determined based on only the variable name "failure rate" and a data type thereof, since the variable names and the data types of both the pieces of determination target software are consistent with those of the verified software, both the pieces of determination target software A and B are determined as "cooperation possible" with the cooperation destination software. However, while the failure rate required by the verified software is obtained based on time-series data called "device time-series information", the failure rate required by the determination target software B is obtained based on static (fixed) data such as catalog information and specifications, and has a meaning different from data planned as the input data by the verified software. When the determination of whether the cooperation possibility is performed based on only the variable name and the data type as described above, the determination target software B to be originally determined as "cooperation impossible" is erroneously determined as "cooperation possible" as stated above.

Thus, the cooperation possibility determination apparatus 100 of the present embodiment determines the cooperation possibility of the determination target software with the cooperation destination software by comparing data output from the determination target software (data planned to be input to the cooperation destination) and data output from the verified software (data input to the cooperation destination) in consideration of meanings of the pieces of data grasped from information regarding configurations of the pieces of software (various kinds of definition information such as source codes and variable definition descriptions, hereinafter, referred to as "software configuration information") and information handled when the pieces of software are executed (hereinafter, referred to as "resource information"), and improves determination accuracy of the cooperation possibility.

Figure 2:
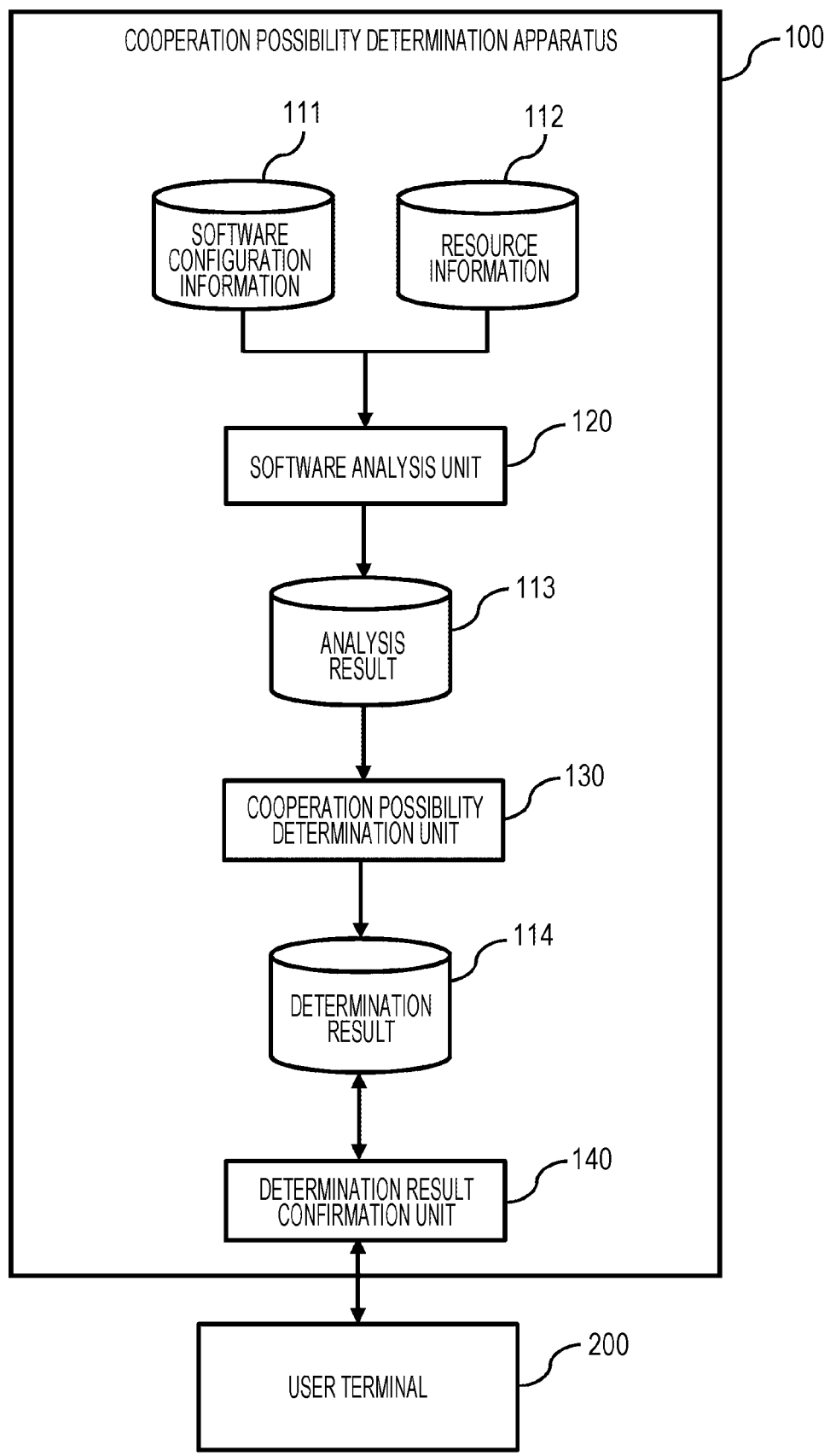
FIG. 2 is a system flow diagram illustrating an outline of functions and operations of a cooperation possibility determination apparatus.

FIG. 2 is a system flow diagram illustrating an outline of functions and operations of the cooperation possibility determination apparatus 100. As illustrated in this diagram, the cooperation possibility determination apparatus 100 is connected so as to be able to communicate with a user terminal 200. The cooperation possibility determination apparatus 100 and the user terminal 200 are both achieved by using information processing apparatuses (computers). The cooperation possibility determination apparatus 100 and the user terminal 200 may be achieved by a common information processing apparatus.

As illustrated in this diagram, the cooperation possibility determination apparatus 100 has functions of a software analysis unit 120, a cooperation possibility determination unit 130, and a determination result confirmation unit 140. The cooperation possibility determination apparatus 100 stores software configuration information 111, resource information 112, analysis result 113, and determination result 114.

The software configuration information 111 includes the above-mentioned software configuration information, and includes the source codes and various kinds of definition information of the cooperation destination software and the determination target software used when the source codes are executed. The software configuration information 111 is set by, for example, the user. The software configuration information 111 is acquired from, for example, a repository used for software development, maintenance, and operation.

The resource information 112 is the above-mentioned resource information, and includes information (data) used when the cooperation destination software and the determination target software are executed. All the "period", "device time-series information", "maintenance record", "device model ID", "device information", and the like exemplified in FIGS. 1A to 1C correspond to the resource information.

The software analysis unit 120 analyzes the verified software and the determination target software based on the software configuration information 111 and the resource information 112, and outputs information obtained by the analysis (hereinafter, referred to as an "analysis result") as the analysis result 113. The above-described analysis is, for example, analysis for a call relationship between various kinds of processing achieved when the pieces of software are executed and analysis for data handled in various kinds of processing.

The cooperation possibility determination unit 130 determines the cooperation possibility of the determination target software and the cooperation destination software by comparing information regarding output data of the determination target software with information regarding output data of the verified software based on the analysis result 113, and outputs the result (hereinafter, referred to as "determination result") as the determination result 114. The cooperation possibility determination unit 130 determines, for example, the cooperation possibility of the determination target software accepted from the user via the user terminal 200 with the cooperation destination software, and presents the determination result 114 to the user via the user terminal 200. The cooperation possibility determination unit 130 determines the cooperation possibility based on, for example, consistency or similarity between the information regarding the output data of the determination target software and the information regarding the output data of the verified software. For example, the cooperation possibility determination unit 130 determines as "cooperation possible" when the consistency or similarity between the information regarding the output data of the determination target software and the information regarding the output data of the verified software exceeds a preset threshold, and determines as "cooperation impossible" when consistency or similarity between the information regarding the output data of the determination target software and the information regarding the output data of the verified software is equal to or less than the above-described threshold. The cooperation possibility determination unit 130 outputs the determination result to the determination result 114. For example, when it is determined as "cooperation impossible", the cooperation possibility determination unit 130 outputs a determination reason (difference and similarity of each information) of "cooperation impossible" to the determination result 114.

The determination result confirmation unit 140 presents contents of the determination result 114 and information regarding the software (information acquired from the software configuration information 111, the resource information 112, and the analysis result 113 for each software) to the user via the user terminal 200 at any time. The determination result confirmation unit 140 accepts the confirmation of the determination result 114 (approval/disapproval for the determination result of the cooperation possibility of each determination target software with the cooperation destination software) from the user via the user terminal 200, and reflects the accepted result to the determination result 114. As stated above, the final determination of the cooperation possibility of the determination target software with the cooperation destination software can be performed by the user with reference to the determination result by the cooperation possibility determination apparatus 100 and the reason of the determination.

Next, the information managed (stored) by the cooperation possibility determination apparatus 100 will be described in detail.

FIG. 3A illustrates an example of the software configuration information 111. As illustrated in this diagram, the exemplified software configuration information 111 includes one or more entries (records) having each item of a software ID 1111, a source code 1112, and definition information (1) to (n). One of the records of the software configuration information 111 corresponds to one software.

Of the above-described items, a software ID which is a software identifier is set in the software ID 1111. In this example, it is assumed that the software ID of the verified software is "Reference 1", the software ID of the determination target software A is "Program A", and the software ID of the determination target software B is "Program B". A substance of the source code or a location of the source code (for example, a folder name, a Uniform Resource Locator (URL), or the like) is set in the source code 1112. Various kinds of information (data definition descriptions) used together with the source code are set in the definition information (1) to (n). The definition information (1) to (n) include information useful when the meaning of the output data of the software is analyzed.

FIG. 3B illustrates an example of the resource information 112. As illustrated in this diagram, the exemplified resource information 112 includes one or more entries (records) having each item of a software ID 1121, a resource name 1122, a location information 1123, data characteristics 1124, and a temporal change 1125. One of the records of the resource information 112 corresponds to one resource used by the software.

Of the above-described items, the software ID is set in the software ID 1121. A resource name which is a name of a resource is set in the resource name 1122. Information indicating a location of a resource is set in the location information 1123. Information indicating data characteristics (finite value (example: 0, 10, 20, 30), discrete value (example: 0, 1, 2, 3, . . . ), or continuous value (example: 0×1)) of the resource is set in the data characteristic 1124. Information indicating whether or not the resource is time-series data ("Yes" when the resource is the time-series data, "No" when the resource is not the time-series data) is set in a temporal change 1125.

FIG. 4 shows an example of the analysis result 113. The results of the above-mentioned analysis (information regarding pieces of data handled by the determination target software and the verified software and the like) are managed in the analysis result 113. The analysis result 113 illustrated in this diagram is merely an example, and the analysis result 113 can take various aspects depending on the kind and nature of the information used by the cooperation possibility determination unit 130 when the cooperation possibility is determined.

As illustrated in this diagram, the exemplified analysis result 113 includes one or more entries (records) having each item of a software ID 1131, output data 1132, input data 1133, and an acquisition source type 1134. One of the records of the analysis result 113 corresponds to one of the pieces of data handled by the determination target software and the verified software.

The software ID is set in the software ID 1131. An identifier (variable name in this example) of the output data (data input to the cooperation destination software) of the software is set in the output data 1132. An identifier (data name in this example) of data used to generate the output data of the entry in the software of the entry is set in the input data 1133. In the acquisition source type 1134, Information indicating a type of an acquisition source of the input data of the entry is set, and "internal" is set when the data is data directly acquired by the software of the entry, and "external" is set when the data is data provided from the outside.

FIG. 5 shows an example of the determination result 114. The result of the cooperation possibility of the determination target software for each combination of the verified software and the determination target software (including both a combination of the verified software and a combination of different pieces of determination target software) is managed in the determination result 114. As illustrated in this diagram, the exemplified determination result 114 includes one or more entries (records) having each item of a software ID(1) 1141, a software ID(2) 1142, a cooperation possibility 1143, a determination reason 1144, and approval/disapproval 1145. One of the records of the determination result 114 corresponds to one of the software combinations.

The software ID of one software of the combination of two pieces of software to be determined for the cooperation possibility is set in software ID(1) 1141. The software ID of the other software of the above-described combination is set in the software ID(2) 1142.

Information indicating the determination result of the cooperation possibility of the determination target software with the cooperation destination software in the combination is set in the cooperation possibility 1143. In this example, "possible" is set in the case of the cooperation possible, and "impossible" is set in the case of the cooperation impossible. When the above-described combination is the combination of the verified software and the determination target software, the determination result of the cooperation possibility based on a result obtained by comparing the verified software with the determination target software is set in the cooperation possibility 1143. When the above-described combination is the combination of the different pieces of determination target software, the determination result of the cooperation possibility of the other determination target software (in this example, the determination target software having the software ID of the software ID(1) 1141) with one determination target software (in this example, the determination target software having the software ID of software ID(2) 1142) as a reference is set in the cooperation possibility 1143. In this diagram, the software of which the software ID set in the software ID(1) 1141 is "Program C" is software (hereinafter, referred to as "determination target software C") for which the cooperation possibility with the cooperation destination software is to be determined with the determination target software A of which the software ID set to the software ID(1) 1141 is "Program A" as a reference.

Information indicating the determination reason of the cooperation possibility is set in the determination reason 1144. The content of the determination reason 1144 is presented to the user via the user terminal 200, for example, when the user confirms (determines approval or disapproval) the determination result of the cooperation possibility of the other determination target software with the same cooperation destination software. Accordingly, the user can appropriately determine the approval or disapproval of the determination result of the cooperation possibility of the determination target software while referring to the past determination reason reasons.

A result including an intention of the user for approval or disapproval based on the determination result (content of the cooperation possibility 1143) and the determination reason (determination reason 1144) is set in the approval/disapproval 1145. When the user approves the determination result, "approval" is set, and when the user does not approve, "disapproval" is set.

Determination Result Confirmation Screen

Figure 6:
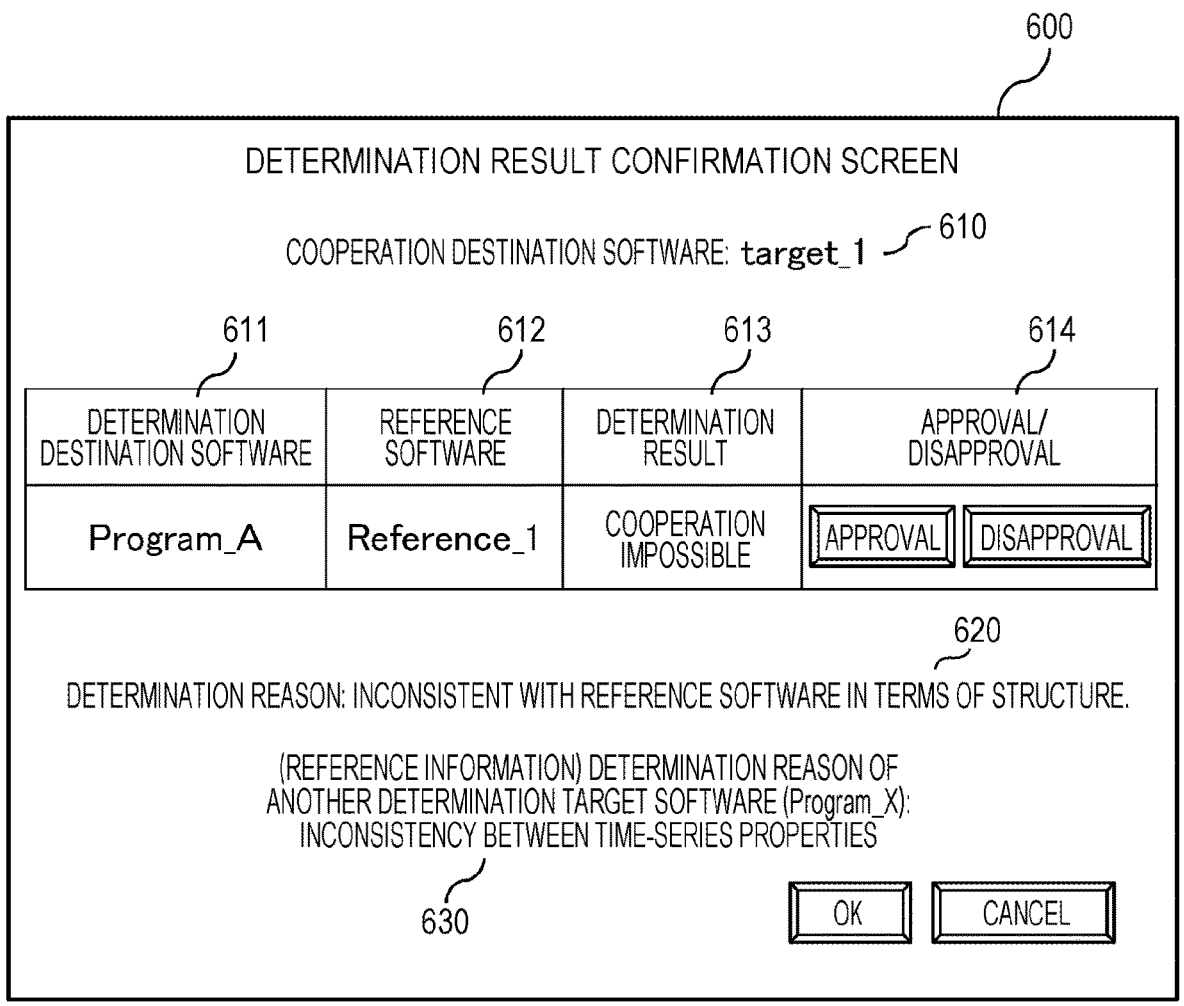
FIG. 6 is an example of a determination result confirmation screen.

FIG. 6 is an example of a screen presented to the user by the determination result confirmation unit 140 via the user terminal 200. The screen will be hereinafter referred to as a "determination result confirmation screen 600". The determination result confirmation unit 140 presents the determination result of the cooperation possibility performed by the cooperation possibility determination unit 130 to the user via the determination result confirmation screen 600, and also accepts the intention for the approval or disapproval of the determination result from the user. The determination result confirmation unit 140 reflects the intention for approval or disapproval accepted through the determination result confirmation screen 600 on product/disapproval 1145 of the determination result 114.

As illustrated in this diagram, the determination result confirmation screen 600 includes a cooperation destination software display field 610, a determination target software display field 611, a reference software display field 612, a determination result display field 613, an approval/disapproval setting acceptance field 614, a determination reason display field 620, and a reference information display field 630.

The software ID of the cooperation destination software is set in the cooperation destination software display field 610. The software ID of the determination target software is set in the determination target software display field 611. A software ID of a reference software is set in the reference software display field 612. The determination result of the cooperation possibility is displayed in the determination result display field 613. A button for the user to designate approval or disapproval of the determination result is set for the approval/disapproval setting acceptance field 614. The determination reason in the determination result is displayed in the determination reason display column 620. The determination reason when the cooperation possibility of the other determination target software with the same cooperation destination software is determined is set in the reference information display field 630.

Determination Method of Cooperation Possibility

Subsequently, a determination method of the cooperation possibility of the determination target software with the cooperation destination software by the cooperation possibility determination unit 130 will be described.

The cooperation possibility determination unit 130 determines the cooperation possibility of the determination target software with the cooperation destination software based on, for example, commonality between a data type (number of digits in the case of a numerical type, a character type, a logical type, a numerical type) of a variable which is acquired from the source code of the determination target software and in which the output data of the software is stored and a data type of the variable which is acquired from the source code of the verified software and in which the output data of the software is stored. For example, the cooperation possibility determination unit 130 determines that the cooperation of the determination target software with the cooperation destination software is possible (meaning that there is a possibility of being able to cooperate with; the same applies later.) when both the pieces of software are consistent with each other, and determines that the cooperation of the determination target software with the cooperation destination software is impossible (there is a high possibility of not being able to cooperate with; the same applies later) when both the pieces of software are not consistent with each other. The commonality of the data types may be determined for whether or not the data types of both the pieces of software are completely consistent with each other, and further may be flexibly set such that a difference in the number of characters and the number of digits is allowed, for example.

For example, the cooperation possibility determination unit 130 determines the cooperation possibility based on the consistency between the variable name of the variable which is acquired from the source code of the determination target software and in which the output data of the software is stored and the name (variable name) of the variable which is acquired from the source code of the verified software and in which the output data of the software is stored. For example, the cooperation possibility determination unit 130 determines that the cooperation of the determination target software with the cooperation destination software is possible when both the pieces of software are consistent with each other, and determines that the cooperation of the determination target software with the cooperation destination software is impossible when both the pieces of software are not consistent with each other. Whether or not the variable names are consistent with each other may be determined for whether or not the variable names are completely consistent with each other. In addition, when it is determined that there is a synonym relationship between them using a synonym dictionary, the variable names may be regarded as being consistent with each other.

For example, when both the output data of the determination target software acquired from the source code of the determination target software and the output data of the verified software acquired from the source code of the verified software are numerical values, the cooperation possibility determination unit 130 determines the cooperation possibility based on whether or not both numerical characteristics (finite values, discrete values, or continuous values) of both the pieces of data are consistent with each other. For example, the cooperation possibility determination unit 130 determines that the cooperation of the determination target software with the cooperation destination software is possible when the numerical characteristics of both the pieces of data are consistent with each other, and determines that the determination target software with the cooperation destination software is impossible when the numerical characteristics of both the pieces of data are not consistent with each other. For example, the cooperation possibility determination unit 130 specifies the numerical characteristics of the output data by analyzing an assignment statement or a definition statement described for the variable in which the data is stored in the source code. When the value of the output data is decided based on the content of the resource information 112, the cooperation possibility determination unit 130 specifies the numerical characteristics of the output data based on the content of the data characteristic 1124 of the resource information 112.

For example, the cooperation possibility determination unit 130 determines the cooperation possibility based on presences or absences of time-series properties of the output data of the determination target software acquired from the source code of the determination target software and the output data of the verified software acquired from the source code of the verified software. For example, the cooperation possibility determination unit 130 determines that the cooperation is possible when both the pieces of output data have the time-series properties, and determines that the cooperation is impossible when one output data has the time-series properties but the other output data does not have the time-series properties. The cooperation possibility determination unit 130 specifies whether or not the data has the time-series properties, for example, based on time-series properties of a value assigned or defined by analyzing the assignment statement or the definition statement described for the variable in which the data is stored. When the value of the data is based on the content of the resource information 112, the cooperation possibility determination unit 130 specifies the time-series properties of the data based on the content of the temporal change 1125 of the resource information 112. For example, a dictionary of variable names used for data having time-series properties may be created, and the cooperation possibility determination unit 130 may specify the time-series properties based on whether or not the variable name of the variable in which the data is stored is present in the dictionary.

For example, the cooperation possibility determination unit 130 determines the cooperation possibility based on computational properties of each of the output data of the determination target software acquired from the source code of the determination target software and the output data of the verified software acquired from the source code of the verified software (whether or not the output data is a target of numerical computation). For example, the cooperation possibility determination unit 130 determines that the cooperation is possible when both the pieces of data have the computational properties, and determines that the cooperation is impossible when only one output data has the computational properties. The cooperation possibility determination unit 130 specifies the computational properties based on, for example, whether or not the variable in which the data is stored is subject to the target of the computation in the source code. Examples of the data having the computational properties (quantitative data) include "score", "time", "age", "height", "weight", "elapsed time", and the like. For the pieces of data having the computational properties, the consistency between scales of the pieces of data may be further specified, and the cooperation possibility may be determined based on the consistency between the scales. Examples of the scale include an interval scale (an interval has a meaning, and zero is also one state; for example, a quantity to be added or subtracted such as "score", "time", "age", or the like) and a ratio scale (a ratio has a meaning, for example, zero means that there is no value; for example, "height", "weight", "elapsed time", and the like). Examples of the data having no computational properties (qualitative data) include "name", "gender", "address", "telephone number", "grade", "satisfaction", and the like. For the pieces of data having no computational properties, the consistency between the scales of the pieces of data may be further specified, and the cooperation possibility may be determined based on the consistency between the scales. Examples of the scale include a nominal scale (data of which an order has no meaning; for example, "gender", "address", and "phone number") and an ordinal scale (data of which an order has a meaning; for example, "grade", "satisfaction", and the like).

For example, the cooperation possibility determination unit 130 determines the cooperation possibility based on the similarity between the source code of the determination target software and the source code of the verified software. For example, the cooperation possibility determination unit 130 obtains the similarity between both the source codes by a method using a difference extraction tool based on the longest common subsequence (LCS) which is an algorithm for finding the longest common subsequence, a method using the similarity between words in a program and a cyclomatic number which is the complexity of a program structure, a method using the cosine similarity obtained from a vector obtained by expressing each structure with a syntax tree. For example, the cooperation possibility determination unit 130 determines that the cooperation is possible when the obtained similarity exceeds a preset threshold, and determines that the cooperation is impossible when the similarity is equal to or less than the above-described threshold.

Figure 7:
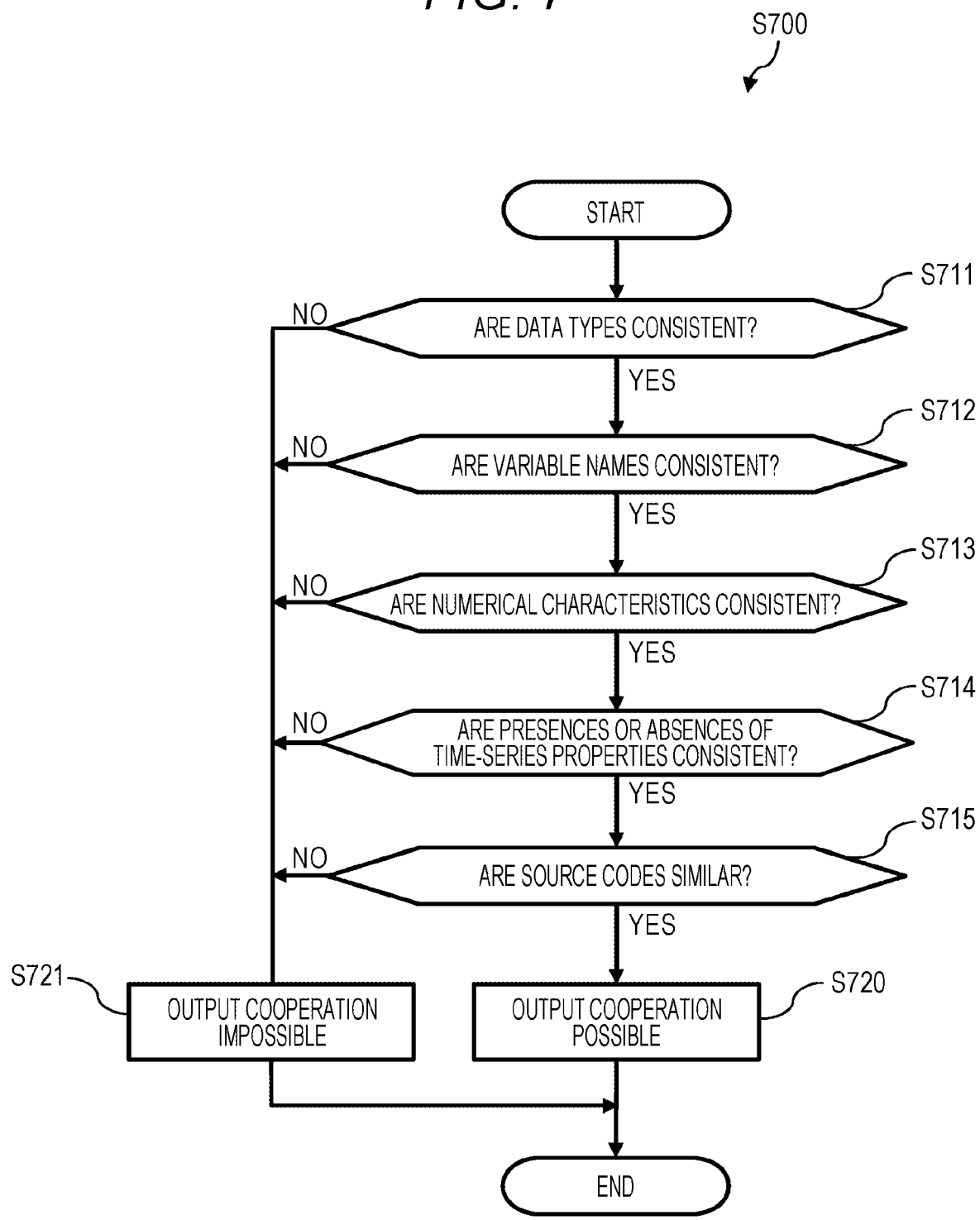
FIG. 7 is a flowchart illustrating cooperation possibility determination processing.

FIG. 7 is a flowchart illustrating an example of processing of determining the cooperation possibility of the determination target software with the cooperation destination software by the cooperation possibility determination unit 130 (hereinafter, referred to as "cooperation possibility determination processing S700"). Hereinafter, the cooperation possibility determination processing S700 will be described with reference to this flowchart.

First, the cooperation possibility determination unit 130 acquires the data type of the output data of the determination target software and the data type of the output data of the verified software by analyzing the source codes thereof, and determines whether or not both the data types are consistent with each other (S711). When both the data types are not consistent with each other (S711: NO), the processing proceeds to S721, and the cooperation possibility determination unit 130 outputs information indicating "cooperation impossible" together with the determination reason. The processing ends. On the other hand, when both the data types are consistent with each other (S711: YES), the processing proceeds to 712.

In S712, the cooperation possibility determination unit 130 acquires the variable name of the output data of the determination target software and the variable name of the output data of the verified software by analyzing the source codes thereof, and determines whether or not both the variable names are consistent with each other. When both the variable names are not consistent with each other (S712: NO), the processing proceeds to S721, and the cooperation possibility determination unit 130 outputs the information indicating "cooperation impossible" together with the determination reason. The processing ends. On the other hand, when both the variable names are consistent with each other (S712: YES), the processing proceeds to S713.

In S713, the cooperation possibility determination unit 130 acquires the numerical characteristics of the output data of the determination target software and the numerical characteristics of the output data of the verified software by analyzing the source codes thereof, and determines whether or not both the numerical characteristics are consistent with each other. When both the numerical characteristics are not consistent with each other (S713: NO), the processing proceeds to S721, and the cooperation possibility determination unit 130 outputs the information indicating "cooperation impossible" together with the determination reason. The processing ends. On the other hand, when both the numerical characteristics are consistent with each other (S713: YES), the processing proceeds to S714.

In S714, the cooperation possibility determination unit 130 determines the presences or absences of the time-series properties of the output data of the determination target software and the presence or absence of the time-series properties of the output data of the verified software by analyzing the source codes thereof, and determines whether or not the presences or absences of the time-series properties of both the pieces of data are consistent with each other. When the presences or absences of the time-series properties of both the pieces of data are not consistent with each other (S714: NO), the processing proceeds to S721, and the cooperation possibility determination unit 130 outputs the information indicating "cooperation impossible" together with the determination reason. The process ends. On the other hand, when the presences or absences of the time-series properties of both the pieces of data are not consistent (S714: YES), the processing proceeds to S715.

In S715, the cooperation possibility determination unit 130 obtains the similarity between the source code of the determination target software and the source code of the verified software, and determines whether or not the similarity exceeds the preset threshold. When the similarity is equal to or less than the preset threshold (S715: NO), the processing proceeds to S721, and the cooperation possibility determination unit 130 outputs the information indicating "cooperation impossible" together with the determination reason. The processing ends. On the other hand, when the similarity exceeds the preset threshold (S715: YES), the cooperation possibility determination unit outputs the information indicating "cooperation possible", and the processing ends.

Although all the determination methods described above are adopted and the cooperation possibility is determined in the cooperation possibility determination processing S700 exemplified above, all the determination methods may not be adopted.

As described above, the cooperation possibility determination apparatus 100 of the present embodiment determines the cooperation possibility of the determination target software by comparing the pieces of software configuration information of the determination target software and the verified software and the pieces of resource information used when the determination target software and the verified software are executed, that is, comparing the output data of the determination target software and the output data of the verified software in consideration of the meanings of both the pieces of output data grasped from the pieces of software configuration information. Thus, according to the cooperation possibility determination apparatus 100 of the present embodiment, it is possible to efficiently determine the cooperation possibility of the software with high accuracy.

Hardware Configuration Example

Figure 8:
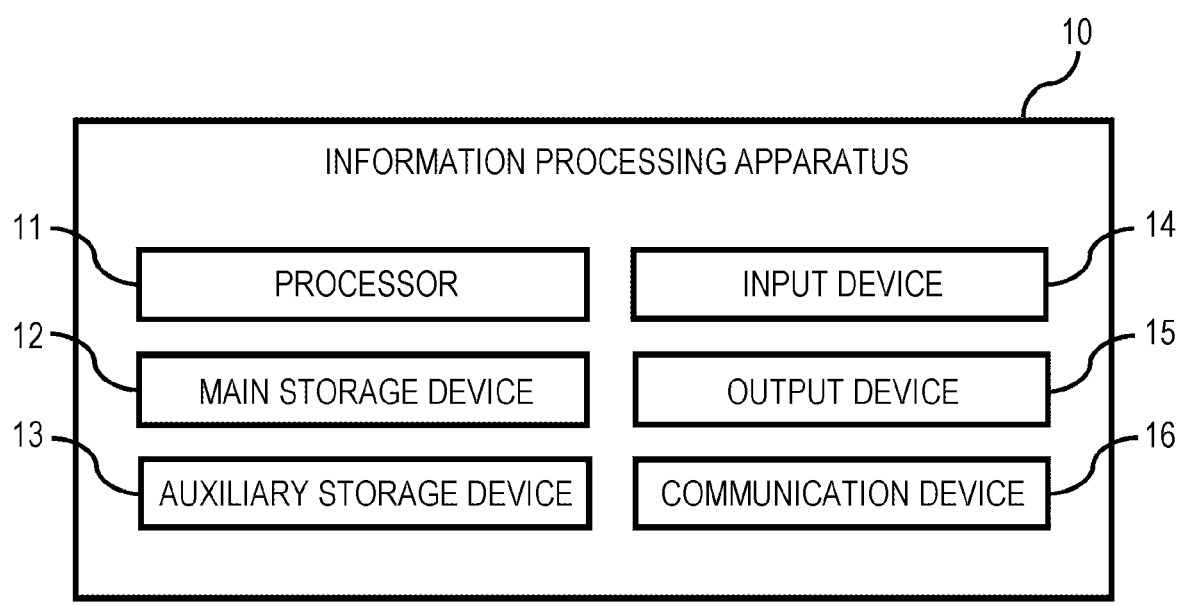
FIG. 8 is an example of a hardware configuration of the cooperation possibility determination apparatus.

FIG. 8 shows an example of a hardware configuration of the cooperation possibility determination apparatus 100. As illustrated in this diagram, an exemplified information processing apparatus 10 includes a processor 11, a main storage device 12, an auxiliary storage device 13, an input device 14, an output device 15, and a communication device 16. The information processing apparatus 10 may be achieved in whole or in part by using virtual information processing resources provided by using a virtualization technology, a process space separation technology, or the like, for example, a virtual server provided by a cloud system. All or a part of functions provided by the information processing apparatus 10 may be achieved by, for example, a service provided by a cloud system via an application programming interface (API) or the like. The cooperation possibility determination apparatus 100 may be constructed by using a plurality of information processing apparatuses 10 connected so as to be able to communicate with each other.

In this diagram, the processor 11 is achieved by using, for example, a central processing unit (CPU), a micro processing unit (MPU), a graphics processing unit (GPU), a field programmable gate array (FPGA), an application specific integrated circuit (ASIC), an artificial intelligence (AI) chip, or the like.

The main storage device 12 is a device that stores programs and data, and is, for example, a read only memory (ROM), a random access memory (RAM), a non-volatile memory (NVRAM), or the like.

The auxiliary storage device 13 is, for example, a reading and writing device of a recording medium such as a solid state drive (SSD), a hard disk drive, an optical storage device (compact disc (CD), digital versatile disc (DVD), or the like), a storage system, an IC card, an SD card, or an optical recording medium, a storage area for a cloud server, or the like. Programs and data can be read into the auxiliary storage device 13 via a reading device of the recording medium or the communication device 16. The programs and data stored (stored) in the auxiliary storage device 13 are read into the main storage device 12 at any time. The auxiliary storage device 13 constitutes a function of storing various kinds of data (hereinafter, referred to as a "storage unit").

The input device 14 is an interface that accepts inputs from the outside, and is, for example, a keyboard, a mouse, a touch panel, a card reader, a pen input type tablet, a voice input device, or the like.

The output device 15 is an interface that outputs various kinds of information such as processing progress and processing results. The output device 15 is, for example, a display device (liquid crystal monitor, liquid crystal display (LCD), graphic card, or the like) that visualizes the above-mentioned various kinds of information, a device (voice output device (speaker or the like)) that converts the above-mentioned various kinds of information into voice, or a device (printing device or the like) that converts the above-described various kinds of information into characters. For example, the information processing apparatus 10 may be configured to input and output information to and from another apparatus via the communication device 16.

The input device 14 and the output device 15 constitute a user interface for accepting and presenting information from and to the user.

The communication device 16 is a device that achieves communication with other apparatuses. The communication device 16 is a wired or wireless communication interface for achieving communication with other apparatuses via a communication network (Internet, local area network (LAN), wide area network (WAN), dedicated line, a public communication network, or the like), and is, for example, a network interface card (NIC), a wireless communication module, a USB module, or the like.

For example, an operating system, a file system, a database management system (DBMS) (relational database, NoSQL, or the like), a key-value store (KVS), or the like may be introduced in the information processing apparatus 10.

The processor 11 reads and executes the programs stored in the main storage device 12, and thus, the various functions of the cooperation possibility determination apparatus 100 are achieved by the hardware (FPGA, ASIC, AI chip, or the like) constituting these devices. The cooperation possibility determination apparatus 100 stores various kinds of information (data) as, for example, a database table or a file managed by a file system.

Although the embodiment according to the present invention has been described, the present invention is not limited to the above-described embodiment, and it is needless to say that various modifications can be made without departing from the scope of the present invention. For example, the aforementioned embodiment is described in detail in order to facilitate easy understanding of the present invention, and are not limited to necessarily include all the described components. Other components can be added, removed, and substituted to, from, and into some of the components of the aforementioned embodiment.

A part or all of the aforementioned configurations, functions, processing units, and processing means may be realized by hardware by designing with integrated circuit, for example. Each of the aforementioned configurations and functions may be realized by software by interpreting and executing a program that realizes each function by the processor. Information such as programs, tables, and files for achieving the functions can be stored in a recording device such as a memory, a hard disk, or a solid state drive (SSD), or a recording medium such as an IC card, an SD card, or a DVD.

An arrangement form of various functional units, various processing units, and various databases of each information processing apparatus described above is merely an example. The arrangement form of various function units, various processing units, and various databases can be changed to an optimum arrangement form from the viewpoint of performance, processing efficiency, communication efficiency, and the like of the hardware and software included in these devices.

The configuration of the database (schema or the like) for storing various kinds of data described above can be flexibly changed from the viewpoint of efficient use of resources, improvement of processing efficiency, improvement of access efficiency, improvement of search efficiency, and the like.

What is claimed is:

1. A software cooperation possibility determination apparatus that is achieved by using an information processing apparatus, the apparatus comprising:
   a storage unit configured to store pieces of software configuration information which are pieces of information regarding configurations of determination target software which is software for which cooperation possibility with cooperation destination software which is software of a cooperation destination is to be determined and verified software which is software verified that the software is able to cooperate with the cooperation destination software;
   a software analysis unit configured to acquire information regarding data output from the determination target software and information regarding data output from the verified software and input to the cooperation destination software from the pieces of software configuration information; and
   a cooperation possibility determination unit configured to determine the cooperation possibility of the determination target software with the cooperation destination software based on consistency or similarity between the information regarding the data output from the determination target software and the information regarding the data output from the verified software and input to the cooperation destination software.

2. The software cooperation possibility determination apparatus according to claim 1, wherein
   the storage unit is configured to further store resource information which is information including information used when the cooperation destination software is executed and information used when the verified software is executed, and
   the software analysis unit is configured to acquire the information regarding the data output from the determination target software and the information regarding the data output from the verified software and input to the cooperation destination software from the pieces of software configuration information or the resource information.

3. The software cooperation possibility determination apparatus according to claim 1, wherein
   the information regarding the data output from the determination target software is information regarding numerical characteristics of the data, and the information regarding the data output from the verified software and input to the cooperation destination software is information regarding numerical characteristics of the data.

4. The software cooperation possibility determination apparatus according to claim 1, wherein
   the information regarding the data output from the determination target software is information regarding presence or absence of time-series properties of the data, and the information regarding the data output from the verified software and input to the cooperation destination software is information regarding presence or absence of time-series properties of the data.

5. The software cooperation possibility determination apparatus according to claim 1, wherein
   the information regarding the data output from the determination target software is information regarding presence or absence of computational properties of the data, and the information regarding the data output from the verified software and input to the cooperation destination software is information regarding presence or absence of computational properties of the data.

6. The software cooperation possibility determination apparatus according to claim 1, wherein
   the information regarding the data output from the determination target software is information regarding a structure of a source code of the determination target software, and the information regarding the data output from the verified software and input to the cooperation destination software is information regarding a structure of a source code of the verified software.

7. The software cooperation possibility determination apparatus according to claim 1, wherein
   the cooperation possibility determination unit is configured to store a result of the determination, and
   the cooperation possibility determination apparatus further comprises a determination result confirmation unit configured to accept information indicating approval or disapproval for the result of the determination from a user while presenting the result of the determination to the user, and store the accepted result in association with the result of the determination.

8. The software cooperation possibility determination apparatus according to claim 7, wherein
   the cooperation possibility determination unit is configured to store the result of determination of the cooperation possibility and a reason that the determination is performed for each combination of the determination target software and the cooperation destination software, and
   in accepting the information indicating the approval or disapproval for the result of the determination of the cooperation possibility of certain determination target software with the cooperation destination software from the user, when the result of the determination of the cooperation possibility of another determination target software with the same cooperation destination software is stored, the determination result confirmation unit presents the result and the reason of the corresponding determination to the user.

9. A software cooperation possibility determination method executed by an information processing apparatus, the method comprising:
   storing pieces of software configuration information which are pieces of information regarding configurations of determination target software which is software for which cooperation possibility with cooperation destination software which is software of a cooperation destination is to be determined and verified software which is software verified that the software is able to cooperate with the cooperation destination software;
   acquiring information regarding data output from the determination target software and information regarding data output from the verified software and input to the cooperation destination software from the pieces of software configuration information; and determining the cooperation possibility of the determination target software with the cooperation destination software based on consistency or similarity between the information regarding the data output from the determination target software and the information regarding the data output from the verified software and input to the cooperation destination software.

10. The software cooperation possibility determination method according to claim 9, further comprising:

storing further resource information which is information including information used when the cooperation destination software is executed and information used when the verified software is executed; and acquiring the information regarding the data output from the determination target software and the information regarding the data output from the verified software and input to the cooperation destination software from the pieces of software configuration information or the resource information.

11. The software cooperation possibility determination method according to claim 9, wherein the information regarding the data output from the determination target software is information regarding numerical characteristics of the data, and the information regarding the data output from the verified software and input to the cooperation destination software is information regarding numerical characteristics of the data.

12. The software cooperation possibility determination method according to claim 9, wherein the information regarding the data output from the determination target software is information regarding presence or absence of time-series properties of the data, and the information regarding the data output from the verified software and input to the cooperation destination software is information regarding presence or absence of time-series properties of the data.

13. The software cooperation possibility determination method according to claim 9, wherein the information regarding the data output by the determination target software is information regarding whether or not the data has computational properties, and the information regarding the data output from the verified software and input to the cooperation destination software is information regarding whether or not the data has the computational properties.

14. The software cooperation possibility determination method according to claim 9, wherein the information regarding the data output from the determination target software is information regarding a structure of a source code of the determination target software, and the information regarding the data output from the verified software and input to the cooperation destination software is information regarding a structure of a source code of the verified software.

15. The software cooperation possibility determination method according to claim 9, further comprising:

storing a result of the determination;

accepting information indicating approval or disapproval for the result of the determination from a user while presenting the result of the determination to the user, and storing the accepted result in association with the result of the determination;

storing the result of the determination of the cooperation possibility and a reason that the determination is performed for each combination of the determination target software and the cooperation destination software; and in accepting the information indicating the approval or disapproval for the result of the determination of the cooperation possibility of certain determination target software with the cooperation destination software from the user, when the result of the determination of the cooperation possibility of another determination target software with the same cooperation destination software is stored, presenting the result and the reason of the corresponding determination to the user.

* * * * *